United States Patent
Vallius et al.

(10) Patent No.: US 9,864,208 B2
(45) Date of Patent: Jan. 9, 2018

(54) DIFFRACTIVE OPTICAL ELEMENTS WITH VARYING DIRECTION FOR DEPTH MODULATION

(71) Applicant: Microsoft Technology Licensing, LLC, Redmond, WA (US)

(72) Inventors: Tuomas Vallius, Espoo (FI); Lauri Sainiemi, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 249 days.

(21) Appl. No.: 14/813,305

(22) Filed: Jul. 30, 2015

(65) Prior Publication Data

US 2017/0031171 A1 Feb. 2, 2017

(51) Int. Cl.
*G02B 27/42* (2006.01)
*G02B 5/18* (2006.01)
(Continued)

(52) U.S. Cl.
CPC ....... *G02B 27/4205* (2013.01); *G02B 5/1819* (2013.01); *G02B 6/34* (2013.01);
(Continued)

(58) Field of Classification Search
CPC .... G02B 2027/0125; G02B 2027/0178; G02B 27/0172; G02B 27/0944; G02B 27/4205; G02B 5/1819; G02B 6/34
(Continued)

(56) References Cited

U.S. PATENT DOCUMENTS

| 3,980,883 A | 9/1976 | Franks |
| 5,061,025 A | 10/1991 | Debesis |

(Continued)

FOREIGN PATENT DOCUMENTS

| CN | 100433043 C | 10/2007 |
| CN | 102902060 A | 1/2013 |

(Continued)

OTHER PUBLICATIONS

"International Search Report and Written Opinion Issued in PCT Application No. PCT/US2016/058332", dated Feb. 21, 2017, 14 Pages.

(Continued)

*Primary Examiner* — Tony Davis
(74) *Attorney, Agent, or Firm* — Mark K. Young; Mayer & Williams PC

(57) ABSTRACT

In an optical display system that includes a waveguide with multiple diffractive optical elements (DOEs), one or more of the DOEs is configured with gratings that have varying depth and varying directions for depth modulation, in which the modulation direction is aligned with the steepest change (i.e., slope) of grating depth. Depth modulation direction may change at a point of transition between different regions in the DOE. For example, with a zero axis being defined along a line parallel to a long side of a DOE, the depth modulation direction can change from a negative angle, with respect to the axis in the plane of the waveguide in one region, to a positive angle in another region, or vice versa. By varying depth modulation direction in a DOE, display uniformity in the optical display system may be increased.

20 Claims, 16 Drawing Sheets

(51) Int. Cl.
*G02B 6/34* (2006.01)
*G02B 27/01* (2006.01)
*G02B 27/09* (2006.01)

(52) U.S. Cl.
CPC ..... *G02B 27/0172* (2013.01); *G02B 27/0944* (2013.01); *G02B 2027/0125* (2013.01); *G02B 2027/0178* (2013.01)

(58) Field of Classification Search
USPC .................................................. 359/566–569
See application file for complete search history.

(56) References Cited

U.S. PATENT DOCUMENTS

| | | |
|---|---|---|
| 5,218,471 A | 6/1993 | Swanson et al. |
| 5,224,198 A | 6/1993 | Jachimowicz |
| 5,340,637 A | 8/1994 | Okai et al. |
| 5,907,427 A | 5/1999 | Scalora et al. |
| 6,046,541 A | 4/2000 | Valliath |
| 6,147,725 A | 11/2000 | Yuuki |
| 6,232,044 B1 | 5/2001 | Gibbons et al. |
| 6,259,561 B1 | 7/2001 | George et al. |
| 6,410,213 B1* | 6/2002 | Raguin ............... G03F 7/001 430/321 |
| 6,700,552 B2 | 3/2004 | Kollin et al. |
| 6,833,956 B2 | 12/2004 | Lee |
| 6,836,365 B2 | 12/2004 | Goto |
| 6,873,463 B2 | 3/2005 | Nakai |
| 6,909,546 B2 | 6/2005 | Hirai |
| 6,950,227 B2 | 9/2005 | Schrader |
| 6,990,275 B2 | 1/2006 | Kersten et al. |
| 7,123,415 B2 | 10/2006 | Mercer |
| 7,129,028 B2 | 10/2006 | Koeda et al. |
| 7,224,854 B2 | 5/2007 | Ellwood, Jr. |
| 7,236,251 B2 | 6/2007 | Takaoka |
| 7,339,738 B1 | 3/2008 | Carr |
| 7,391,524 B1 | 6/2008 | Chen et al. |
| 7,483,604 B2 | 1/2009 | Levola |
| 7,492,517 B2 | 2/2009 | McGrew |
| 7,525,672 B1 | 4/2009 | Chen et al. |
| 7,565,041 B2 | 7/2009 | Little et al. |
| 7,576,866 B2 | 8/2009 | Ohkubo |
| 7,627,018 B1 | 12/2009 | Guilfoyle |
| 7,710,628 B2 | 5/2010 | Morizono et al. |
| 7,719,675 B2 | 5/2010 | Grygier et al. |
| 7,738,746 B2 | 6/2010 | Charters et al. |
| 7,959,308 B2 | 6/2011 | Freeman et al. |
| 7,981,591 B2 | 7/2011 | Li et al. |
| 8,152,307 B2 | 4/2012 | Duelli et al. |
| 8,160,411 B2 | 4/2012 | Levola et al. |
| 8,208,191 B2 | 6/2012 | Gan et al. |
| 8,233,204 B1 | 7/2012 | Robbins |
| 8,314,993 B2 | 11/2012 | Levola |
| 8,376,548 B2 | 2/2013 | Schultz |
| 8,463,080 B1 | 6/2013 | Anderson et al. |
| 8,466,953 B2 | 6/2013 | Levola |
| 8,488,246 B2 | 7/2013 | Border et al. |
| 8,508,848 B2 | 8/2013 | Saarikko |
| 8,548,290 B2 | 10/2013 | Travers |
| 8,579,492 B2 | 11/2013 | Epstein et al. |
| 8,593,734 B2 | 11/2013 | Laakkonen |
| 8,675,182 B2 | 3/2014 | Bamji |
| 8,681,184 B2 | 3/2014 | Seesselberg |
| 8,699,137 B2 | 4/2014 | McGrew |
| 8,736,963 B2 | 5/2014 | Robbins et al. |
| 8,749,796 B2 | 6/2014 | Pesach et al. |
| 8,792,169 B2 | 7/2014 | Jiang et al. |
| 8,830,584 B2 | 9/2014 | Saarikko |
| 9,671,615 B1 | 6/2017 | Vallius |
| 2001/0015851 A1* | 8/2001 | Danziger ............ G02B 5/1876 359/575 |
| 2001/0033716 A1 | 10/2001 | Fukutomi |
| 2001/0036012 A1* | 11/2001 | Nakai ............... G02B 5/1823 359/569 |
| 2002/0080491 A1 | 6/2002 | Goto |
| 2003/0107787 A1 | 6/2003 | Bablumyan |
| 2004/0170356 A1* | 9/2004 | Iazikov ................ G02B 5/203 385/37 |
| 2004/0184147 A1 | 9/2004 | Parikka |
| 2004/0218172 A1 | 11/2004 | DeVerse et al. |
| 2004/0233534 A1 | 11/2004 | Nakanishi |
| 2005/0002611 A1 | 1/2005 | Levola |
| 2005/0180674 A1 | 8/2005 | Ellwood, Jr. |
| 2005/0189315 A1 | 9/2005 | Knight et al. |
| 2006/0056028 A1 | 3/2006 | Wildnauer |
| 2007/0008624 A1 | 1/2007 | Hirayama |
| 2007/0188837 A1 | 8/2007 | Shimizu et al. |
| 2007/0201795 A1 | 8/2007 | Rice et al. |
| 2007/0242253 A1 | 10/2007 | Visser et al. |
| 2007/0291362 A1 | 12/2007 | Hill |
| 2008/0043334 A1 | 2/2008 | Itzkovitch |
| 2008/0138013 A1* | 6/2008 | Parriaux ............. G02B 5/1814 385/37 |
| 2008/0212921 A1* | 9/2008 | Gaylord ............... B82Y 20/00 385/14 |
| 2008/0297731 A1 | 12/2008 | Powell et al. |
| 2009/0009486 A1 | 1/2009 | Sato |
| 2009/0040607 A1 | 2/2009 | Amako |
| 2009/0128911 A1 | 5/2009 | Itzkovitch et al. |
| 2009/0180166 A1 | 7/2009 | Hefetz et al. |
| 2009/0245730 A1 | 10/2009 | Kleemann |
| 2009/0257106 A1 | 10/2009 | Tan |
| 2009/0303599 A1* | 12/2009 | Levola .............. G02B 27/0081 359/567 |
| 2010/0079865 A1* | 4/2010 | Saarikko ............ G02B 6/0016 359/566 |
| 2010/0134534 A1 | 6/2010 | Seesselberg |
| 2010/0149073 A1 | 6/2010 | Chaum et al. |
| 2010/0177388 A1 | 7/2010 | Cohen et al. |
| 2010/0231693 A1* | 9/2010 | Levola .............. G02B 27/0081 348/51 |
| 2010/0232016 A1 | 9/2010 | Landa |
| 2010/0277803 A1 | 11/2010 | Pockett |
| 2010/0284085 A1 | 11/2010 | Laakkonen |
| 2010/0296163 A1* | 11/2010 | Saarikko ............ G02B 5/1814 359/567 |
| 2010/0315719 A1* | 12/2010 | Saarikko .......... G02B 27/0081 359/630 |
| 2010/0321781 A1 | 12/2010 | Levola |
| 2011/0002143 A1 | 1/2011 | Saarikko et al. |
| 2011/0019874 A1 | 1/2011 | Jarvenpaa |
| 2011/0038049 A1 | 2/2011 | Vallius |
| 2011/0096401 A1 | 4/2011 | Levola |
| 2011/0115733 A1 | 5/2011 | Shih |
| 2011/0261366 A1* | 10/2011 | Tearney .............. A61B 5/0066 356/479 |
| 2012/0019647 A1 | 1/2012 | Kempe et al. |
| 2012/0075168 A1 | 3/2012 | Osterhout et al. |
| 2012/0120365 A1 | 5/2012 | Legerton |
| 2012/0224062 A1 | 9/2012 | Lacoste |
| 2013/0051730 A1 | 2/2013 | Travers |
| 2013/0077049 A1 | 3/2013 | Bohn |
| 2013/0100362 A1 | 4/2013 | Saeedi et al. |
| 2013/0135193 A1 | 5/2013 | Fike, III |
| 2013/0242392 A1 | 9/2013 | Amirparviz et al. |
| 2013/0250430 A1 | 9/2013 | Robbins et al. |
| 2013/0261782 A1* | 10/2013 | Becken ................. G02C 7/02 700/95 |
| 2013/0314793 A1 | 11/2013 | Robbins |
| 2013/0322810 A1 | 12/2013 | Robbins |
| 2014/0002608 A1* | 1/2014 | Atwell ................. G01B 5/008 348/46 |
| 2014/0043689 A1 | 2/2014 | Mason |
| 2014/0104665 A1 | 4/2014 | Popovich et al. |
| 2014/0140654 A1 | 5/2014 | Brown et al. |
| 2014/0168167 A1 | 6/2014 | Chou |
| 2014/0168260 A1 | 6/2014 | O'Brien et al. |
| 2014/0185142 A1 | 7/2014 | Gupta et al. |
| 2014/0217385 A1 | 8/2014 | Gaertner et al. |
| 2014/0240613 A1 | 8/2014 | Bohn et al. |
| 2014/0240834 A1 | 8/2014 | Mason |
| 2014/0240843 A1 | 8/2014 | Kollin |

(56) References Cited

U.S. PATENT DOCUMENTS

| | | | |
|---|---|---|---|
| 2014/0293434 A1 | 10/2014 | Cheng | |
| 2014/0300695 A1 | 10/2014 | Smalley et al. | |
| 2015/0034591 A1 | 2/2015 | Vink | |
| 2015/0083917 A1 | 3/2015 | Wyrwas | |
| 2015/0092042 A1 | 4/2015 | Fursich | |
| 2015/0108479 A1 | 4/2015 | Brinkley | |
| 2015/0185475 A1 | 7/2015 | Saarikko | |
| 2015/0234477 A1 | 8/2015 | Abovitz | |
| 2015/0234491 A1 | 8/2015 | Liu | |
| 2015/0277116 A1* | 10/2015 | Richards | G02B 27/0103 359/13 |
| 2015/0331544 A1* | 11/2015 | Bergstrom | G06F 3/0428 345/175 |
| 2015/0355394 A1 | 12/2015 | Valera | |
| 2015/0382465 A1 | 12/2015 | Steyn | |
| 2016/0018637 A1 | 1/2016 | Sparks | |
| 2016/0026253 A1 | 1/2016 | Bradski | |
| 2016/0116739 A1* | 4/2016 | TeKolste | G02B 27/0172 385/36 |
| 2016/0231570 A1* | 8/2016 | Levola | G02B 27/0172 |
| 2016/0234485 A1* | 8/2016 | Robbins | H04N 13/0429 |
| 2016/0291405 A1* | 10/2016 | Frisken | G02F 1/133504 |
| 2016/0327789 A1* | 11/2016 | Klug | G02B 27/0101 |
| 2016/0334635 A1 | 11/2016 | Ushigome | |
| 2017/0003504 A1* | 1/2017 | Vallius | G02B 27/0101 |
| 2017/0003505 A1* | 1/2017 | Vallius | G02B 5/1819 |
| 2017/0031171 A1* | 2/2017 | Vallius | G02B 5/1819 |
| 2017/0034435 A1* | 2/2017 | Vallius | H04N 5/23229 |
| 2017/0059879 A1* | 3/2017 | Vallius | G02B 27/4205 |
| 2017/0102543 A1* | 4/2017 | Vallius | G02B 27/0172 |
| 2017/0102544 A1* | 4/2017 | Vallius | G02B 27/0172 |
| 2017/0122725 A1* | 5/2017 | Yeoh | G01B 11/14 |
| 2017/0123208 A1* | 5/2017 | Vallius | G02B 27/0172 |
| 2017/0124928 A1* | 5/2017 | Edwin | G09G 3/003 |
| 2017/0131460 A1* | 5/2017 | Lin | G02B 6/0026 |
| 2017/0131545 A1 | 5/2017 | Wall | |
| 2017/0131546 A1 | 5/2017 | Woltman | |
| 2017/0131551 A1 | 5/2017 | Robbins | |
| 2017/0139210 A1* | 5/2017 | Vallius | G02B 27/0172 |

FOREIGN PATENT DOCUMENTS

| | | |
|---|---|---|
| CN | 103677448 A | 3/2014 |
| EP | 2163924 A1 | 3/2010 |
| EP | 2752691 A1 | 7/2014 |
| EP | 2887119 A1 | 6/2015 |
| GB | 2495398 A | 4/2013 |
| JP | S6218502 A | 1/1987 |
| WO | 2004055556 A1 | 7/2004 |
| WO | 2004109349 A2 | 12/2004 |
| WO | 2006064334 A1 | 6/2006 |
| WO | 2006132614 A1 | 12/2006 |
| WO | 2007141589 A1 | 12/2007 |
| WO | 2008038058 A1 | 4/2008 |
| WO | 2008081070 A1 | 7/2008 |
| WO | 2008148927 A1 | 12/2008 |
| WO | 2009077803 A1 | 6/2009 |
| WO | 2009101236 A1 | 8/2009 |
| WO | 2009101238 A1 | 8/2009 |
| WO | 2010062481 A1 | 1/2011 |
| WO | 2012169889 A1 | 12/2012 |
| WO | 2013033274 A1 | 3/2013 |
| WO | 2013144565 A1 | 10/2013 |
| WO | 2014019558 A1 | 2/2014 |
| WO | 2015063808 A1 | 5/2015 |
| WO | 2016130358 A1 | 8/2016 |

OTHER PUBLICATIONS

Saarikko, et al., "Diffractive Exit-pupil Expander for Spherical Light Guide Virtual Displays Designed for Near-Distance Viewing", In the Journal of Optics A: Pure and Applied Optics, vol. 11, Issue 6, Mar. 31, 2009, 10 Pages.

"International Search Report and Written Opinion Issued in PCT Application No. PCT/US2016/039706", dated Oct. 6, 2016, (13 Pages total).

"International Search Report & Written Opinion Issued in PCT Application No. PCT/US2016/039705", dated Sep. 15, 2016, (13 Pages total).

"International Search Report and Written Opinion Issued in PCT Application No. PCT/US2016/038857", dated Sep. 28, 2016, (16 Pages total).

"International Search Report and Written Opinion Issued in PCT Application No. PCT/US2016/037460", dated Oct. 24, 2016, (12 Pages total).

"International Search Report and Written Opinion Issued in PCT Application No. PCT/US2016/044947", dated Oct. 11, 2016, (14 Pages total).

"International Search Report and Written Opinion Issued in PCT Application No. PCT/US2016/052405", dated Dec. 21, 2016, (10 Pages total).

"International Search Report and Written Opinion Issued in PCT Application No. PCT/US2016/051563", dated Nov. 18, 2016, 10 Pages.

Platte, et al, "Optically Induced Mask-Controlled Time-Variable Periodic Microwave Structures", In IEEE Transactions on Microwave Theory and Techniques, vol. 48, Issue 5, May 2000, (6 pages total).

Srinivasan, Pradeep, "Design and Fabrication of Space Variant Micro Optical Elements", In Doctoral Dissertation, Retrieved on: Nov. 27, 2014, Available at: http://etd.fcla.edu/CF/CFE0002843/Srinivasan_Pradeep_200908_PhD.pdf (160 pages total).

Mirza, et al., "Key Challenges to Affordable See Through Wearable Displays: The Missing Link for Mobile AR Mass Deployment", In Proceedings of SPIE 8720, Photonic Applications for Aerospace, Commercial, and Harsh Environments IV, May 31, 2013, pp. 1-6. (6 pages total).

Levola, Tapani, "Diffractive Optics for Virtual Reality Displays", In Journal of the Society for Information Display, Dec. 2006, (1 page total).

Saarikko, Pasi, "Diffractive Exit-Pupil Expander with a Large Field of View", In Proceedings of Photonics in Multimedia II, 700105 SPIE 7001, Apr. 25, 2008, (3 Pages total).

Kimmel, Jyrki, "Mobile Display Backlight Light Guide Plates Based on Slanted Grating Arrays", In Proceedings of Journal of Photonics for Energy, vol. 2, Mar. 12, 2012, (1 Page total).

Levola, et al., "Replicated Slanted Gratings with a High Refractive Index Material for in and Outcoupling of Light", In Proceedings of Optics Express, vol. 15, Issue 5, Mar. 5, 2007, (8 pages total).

Yang, et al., "High-performance and Compact Binary Blazed Grating Coupler Based on an Asymmetric Subgrating Structure and Vertical Coupling", In Optics Letters, vol. 36, No. 14, Jul. 15, 2011, (5 pages total).

Todd, Michael D., "Fiber Optic Bragg Grating-Based Sensing", Published on: Jun. 15, 2012, Available at: http://www.sem.org/pdf/fiber_bragg_grating_sensing.pdf (36 pages total).

Zhang, et al., "Advances in Optical Fiber Bragg Grating Sensor Technologies", In Photonic Sensors, vol. 2, No. 1, Mar. 2012, (13 pages total).

Uranga, et al., "Focused Ion Beam Nano-structuring of Photonic Bragg Gratings in Al2o3 Waveguides", In Proceedings of 12th Annual Symposium IEEE/LEOS Benelux, Dec. 17, 2007, (4 pages total).

Cheng, et al., "Design of an Ultra-Thin Near-Eye Display with Geometrical Waveguide and Freeform Optics", In Proceedings of Optics Express, vol. 22, Issue 17, Aug. 2014, (15 pages total).

Wang, et al., "Guided-Mode Resonance in Planar Dielectric-Layer Diffraction Gratings", In Journal of Optics Infobase, vol. 7, Isuue 8, Aug. 1, 1990, (3 pages total).

Sentenac, et al., "Angular Tolerant Resonant Grating Filters under Oblique Incidence", Journal of Optics Soc. Am. A, vol. 22, No. 4, Mar. 2005, pp. 475-480 (6 pages total).

Powell, et al., "Novel Approach to Exit Pupil Expansion for Wearable Displays", In Proceeding of the SPIE 4711, Helmet- and Head-Mounted Displays VII, Aug. 5, 2002, (3 pages total).

(56) References Cited

OTHER PUBLICATIONS

Urey, et al, "Microlens Array-Based Exit Pupil Expander for Full-Color Display Applications", In Proceedings of SPIE in Photon Management, vol. 5456, Apr. 2004, (10 pages total).

Zhu, et , "Optical Image Encryption Based on Interference of Polarized Light", In Proceedings of Optics Express, vol. 17, No. 16, Jul. 20, 2009, (7 pages total).

"Second Written Opinion Issued in PCT Application No. PCT/US2016/044947", dated Jul. 13, 2017, (8 Pages total).

"Second Written Opinion Issued in PCT Application No. PCT/US2016/039705", dated Jul. 10, 2017, (7 Pages total).

"Second Written Opinion Issued in PCT Application No. PCT/US2016/039706", dated Jun. 27, 2017, (5 Pages total).

* cited by examiner

DIFFRACTIVE OPTICAL ELEMENTS WITH VARYING DIRECTION FOR DEPTH MODULATION

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

In an optical display system that includes a waveguide with multiple diffractive optical elements (DOEs), one or more of the DOEs is configured with gratings that have varying depth and varying directions for depth modulation, in which the modulation direction is aligned with the steepest change (i.e., slope) of grating depth. Depth modulation direction may change at a point of transition between different regions in the DOE. For example, with a zero axis being defined along a line parallel to a long side of a DOE, the depth modulation direction can change from a negative angle, with respect to the axis in the plane of the waveguide in one region, to a positive angle in another region, or vice versa. By varying depth modulation direction in a DOE, display uniformity in the optical display system may be increased by reducing the "banding" resulting from optical interference that is manifested as dark stripes in the display. Banding may be more pronounced when polymeric materials are used in volume production of the DOEs to minimize system weight as they have less optimal optical properties compared with other materials such as glass. Varying the depth modulation direction can further enable the optical system to be more tolerant to variations—such as variations in thickness, surface roughness, and grating geometry—that may not be readily controlled during manufacturing particularly since such variations are in the submicron range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
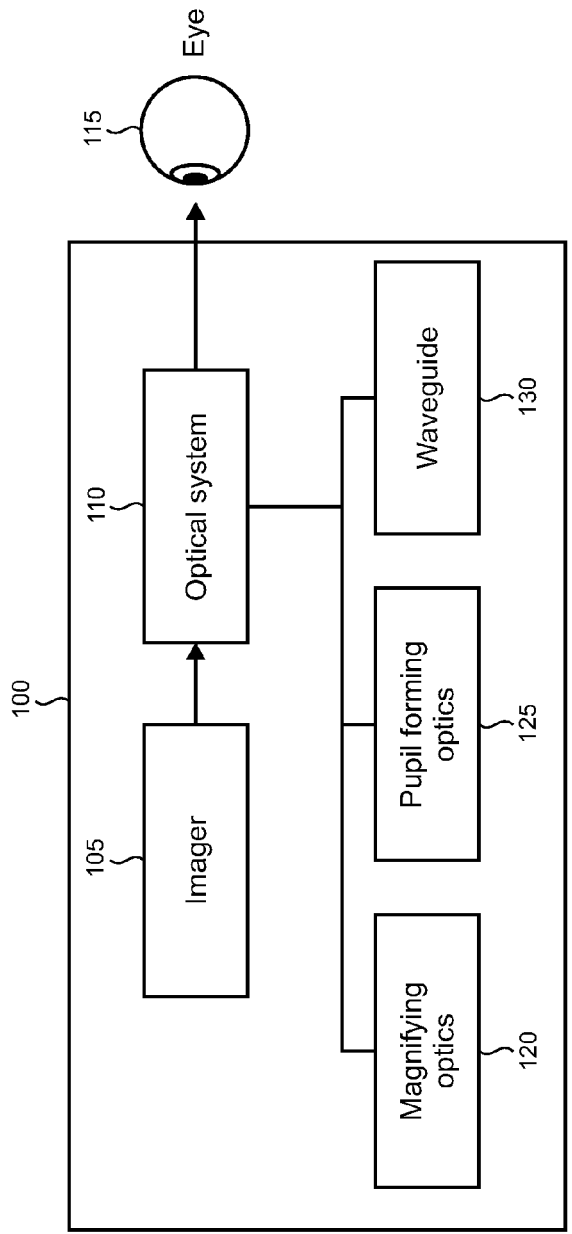
FIG. 1 shows a block diagram of an illustrative near eye display system which may incorporate diffractive optical elements (DOEs) with varying depth modulation direction.

FIG. 1 shows a block diagram of an illustrative near eye display system 100 which may incorporate diffractive optical elements (DOEs) with varying direction for depth modulation. Near eye display systems are frequently used, for example, in head mounted display (HMD) devices in industrial, commercial, and consumer applications. Other devices and systems may also use DOEs with varying direction for depth modulation, as described below. The near eye display system 100 is intended to be an example that is used to illustrate various features and aspects, and the present DOEs are not necessarily limited to near eye display systems.

System 100 may include an imager 105 that works with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130.

In a near eye display system the imager does not actually shine the images on a surface such as a glass lens to create the visual display for the user. This is not feasible because the human eye cannot focus on something that is that close. So rather than create a visible image on a surface, the near eye optical system 100 uses the pupil forming optics 125 to form a pupil and the eye 115 acts as the last element in the optical chain and converts the light from the pupil into an image on the eye's retina as a virtual display.

Figure 2:
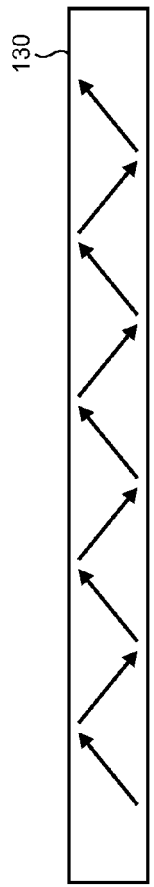
FIG. 2 shows propagation of light in a waveguide by total internal reflection.

The waveguide 130 facilitates light transmission between the imager and the eye. One or more waveguides can be utilized in the near eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the head, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
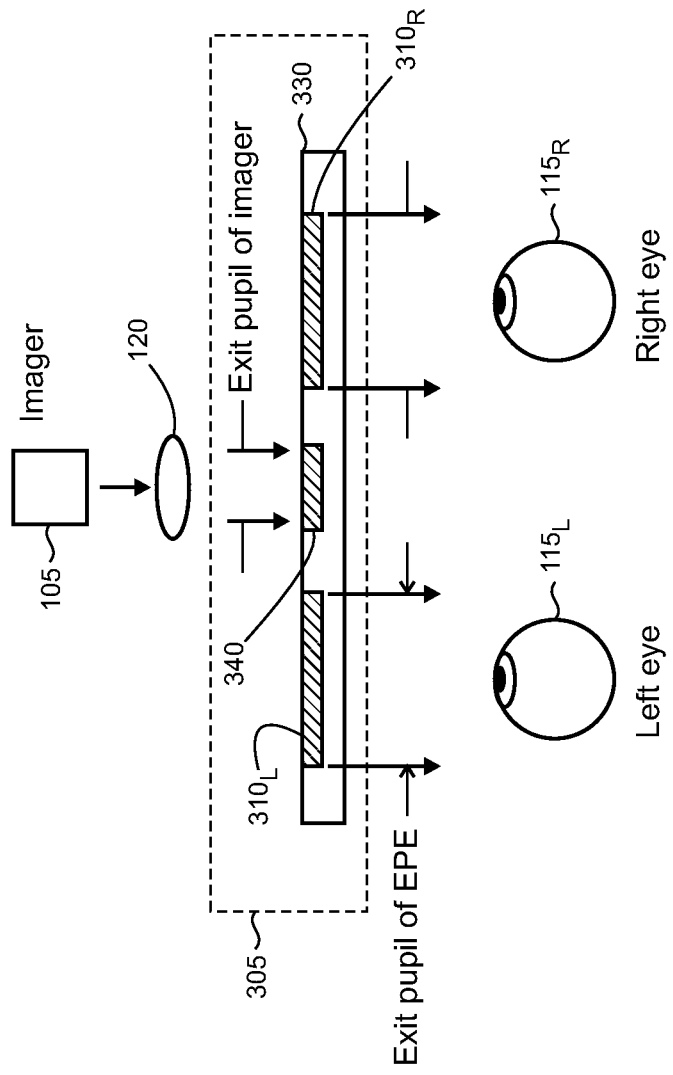
FIG. 3 shows a view of an illustrative exit pupil expander.

FIG. 3 shows a view of an illustrative exit pupil expander (EPE) 305. EPE 305 receives an input optical beam from the imager 105 through magnifying optics 120 to produce one or more output optical beams with expanded exit pupil in one or two dimensions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 305 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 3 for sake of clarity in exposition. The EPE 305 utilizes two out-coupling gratings, $310_L$ and $310_R$ that are supported on a waveguide 330 and a central in-coupling grating 340. The in-coupling and out-coupling gratings may be configured using multiple DOEs, as described in the illustrative example below. While the EPE 305 is depicted as having a planar configuration, other shapes may also be utilized including, for example, curved or partially spherical shapes, in which case the gratings disposed thereon are non-coplanar.

Figure 4:
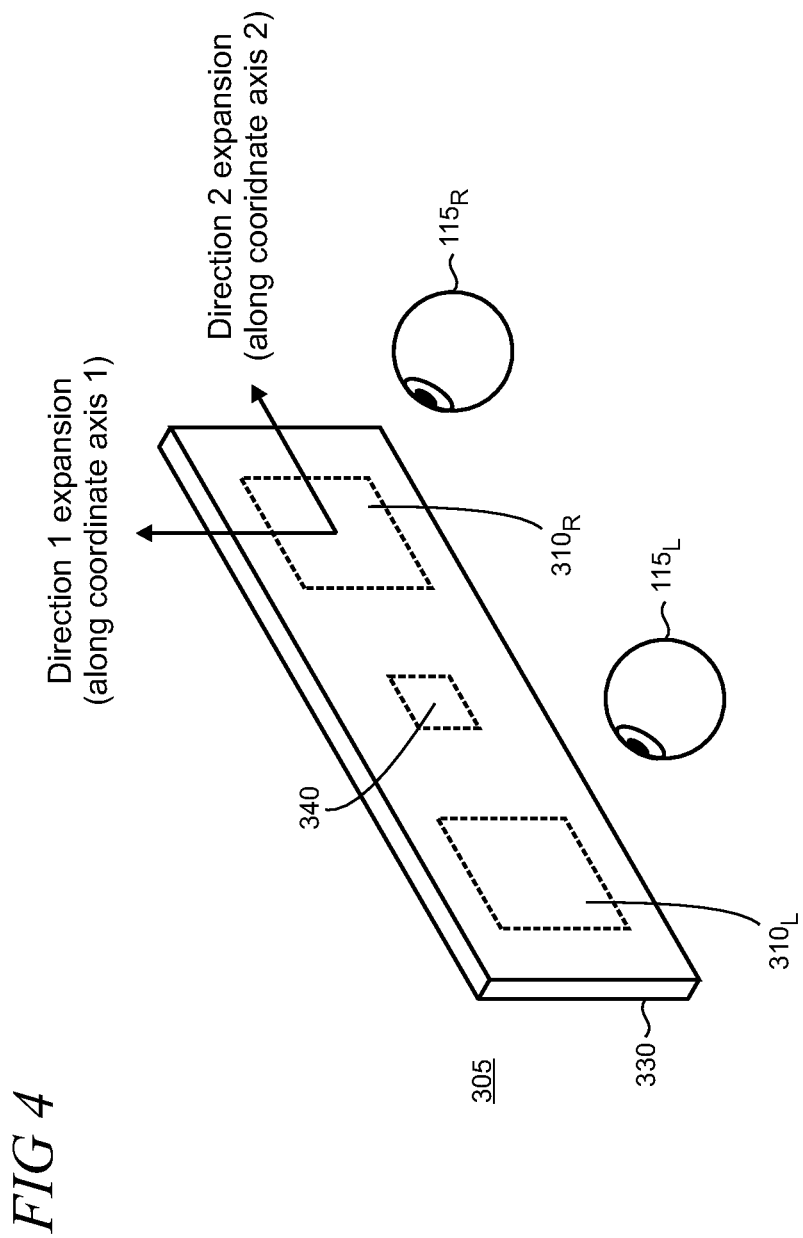
FIG. 4 shows a view of the illustrative exit pupil expander in which the exit pupil is expanded along two directions.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near eye display device is upright and forward facing, but less intuitive for other usage scenarios. The listed terms are not to be construed to limit the scope of the configurations (and usage scenarios therein) of DOEs with varying depth modulation direction.

Figure 5:
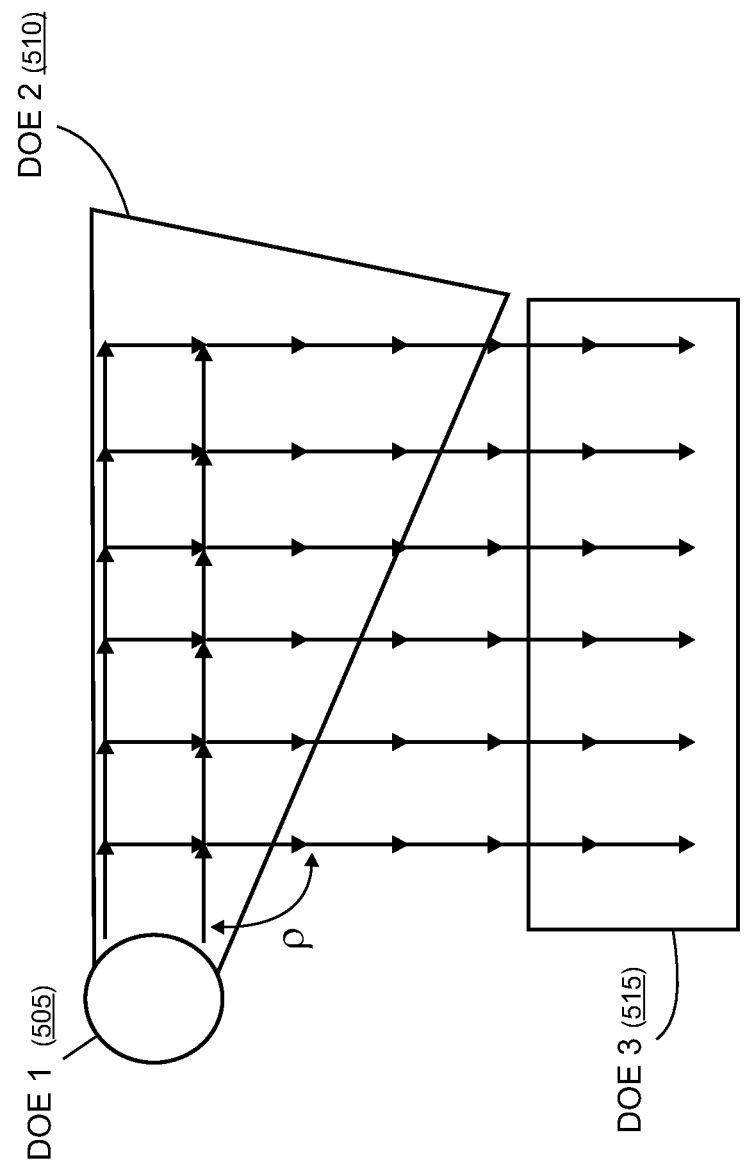
FIG. 5 shows an illustrative arrangement of three DOEs.

FIG. 5 shows an illustrative arrangement of three DOEs that may be used as part of a waveguide to provide in-coupling and expansion of the exit pupil in two directions. Each DOE is an optical element comprising a periodic structure that can modulate various properties of light in a periodic pattern such as the direction of optical axis, optical path length, and the like. The first DOE, DOE 1 (indicated by reference numeral 505), is configured to couple the beam from the imager into the waveguide. The second DOE, DOE 2 (510), expands the exit pupil in a first direction along a first coordinate axis, and the third DOE, DOE 3 (515), expands the exit pupil in a second direction along a second coordinate axis and couples light out of the waveguide. The angle ρ is a rotation angle between the periodic lines of DOE 2 and DOE 3 as shown. DOE 1 thus functions as an in-coupling grating and DOE 3 functions as an out-coupling grating while expanding the pupil in one direction. DOE 2 may be viewed as an intermediate grating that functions to couple light between the in-coupling and out-coupling gratings while performing exit pupil expansion in the other direction. Using such intermediate grating may eliminate a need for conventional functionalities for exit pupil expansion in an EPE such as collimating lenses.

Some near eye display system applications, such as those using HMD devices for example, can benefit by minimization of weight and bulk. As a result, the DOEs and waveguides used in an EPE may be fabricated using lightweight polymers. Such polymeric components can support design goals for, size, weight, and cost, and generally facilitate manufacturability, particularly in volume production settings. However, polymeric optical elements generally have lower optical resolution relative to heavier high quality glass. Such reduced optical resolution and the waveguide's configuration to be relatively thin for weight savings and packaging constraints within a device can result in optical interference that appears as a phenomena referred to as "banding" in the display. The optical interference that results in banding arises from light propagating within the EPE that has several paths to the same location, in which the optical path lengths differ.

The banding is generally visible in the form of dark stripes which decrease optical uniformity of the display. Their location on the display may depend on small nanometer-scale variations in the optical elements including the DOEs in one or more of thickness, surface roughness, or grating geometry including grating line width, angle, fill factor, or the like. Such variation can be difficult to characterize and manage using tools that are generally available in manufacturing environments, and particularly for volume production. Conventional solutions to reduce banding include using thicker waveguides which can add weight and complicate package design for devices and systems. Other solutions use pupil expansion in the EPE in just one direction which can result in a narrow viewing angle and heightened sensitivity to natural eye variations among users.

Figure 6:
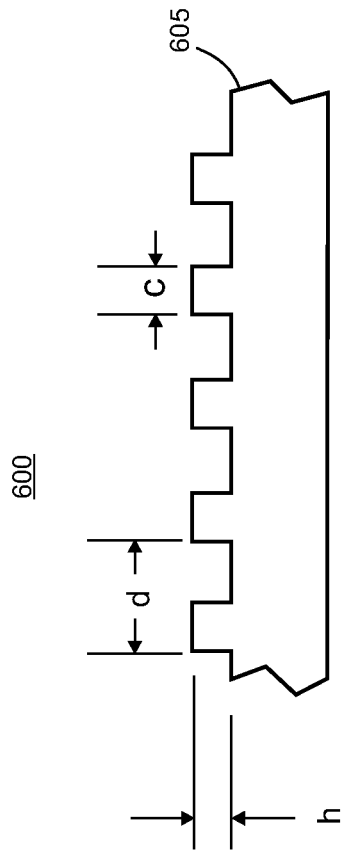
FIG. 6 shows a profile of a portion of an illustrative diffraction grating that has straight gratings.
Figure 7:
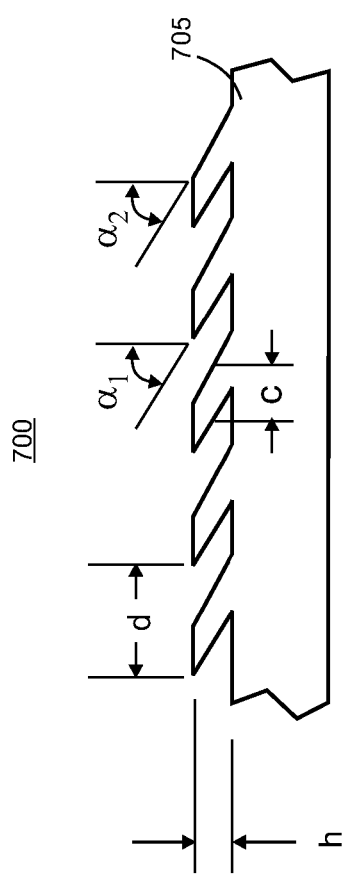
FIG. 7 shows an asymmetric profile of a portion of an illustrative diffraction grating that has slanted gratings.

By comparison, when one or more of the DOEs 505, 510, and 515 (FIG. 5) are configured with gratings that have an asymmetric profile, banding can be reduced even when the DOEs are fabricated from polymers and the waveguide 130 (FIG. 1) is relatively thin. FIG. 6 shows a profile of straight (i.e., non-slanted) grating features 600 (referred to as grating bars, grating lines, or simply "gratings"), that are formed in a substrate 605. By comparison, FIG. 7 shows grating features 700 formed in a substrate 705 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles.

In FIGS. 6 and 7, the grating period is represented by d, the grating height by h (also referred to as grating "depth"), bar width c, and the filling factor by f, where f=c/d. The slanted gratings in FIG. 7 may be described by slant angles $\alpha_1$ and $\alpha_2$. In one exemplary embodiment, for a DOE, d=390 nm, c=d/2, h=300 nm, $\alpha_1=\alpha_2=45$ degrees, f=0.5, and the refractive index of the substrate material is approximately 1.71. In other implementations, ranges of suitable values may include d=250 nm-450 nm, h=200 nm-400 nm, f=0.3-0.0, and $\alpha_1$=30-50 degrees, with refractive indices of 1.7 to 1.9. In another exemplary embodiment, DOE 2 is configured with portions that have asymmetric profiles, while DOE 1 and DOE 3 are configured with conventional symmetric profiles using straight gratings.

By slanting the gratings in one or more of the DOEs 505, 510, and 515, banding can be reduced to increase optical uniformity while enabling manufacturing tolerances for the DOEs to be less strict, as compared with using the straight grating features shown in FIG. 6 for the same level of uniformity. That is, the slanted gratings shown in FIG. 7 are more tolerant to manufacturing variations noted above than the straight gratings shown in FIG. 6, for comparable levels of optical performance (e.g., optical resolution and optical uniformity).

Figure 8:
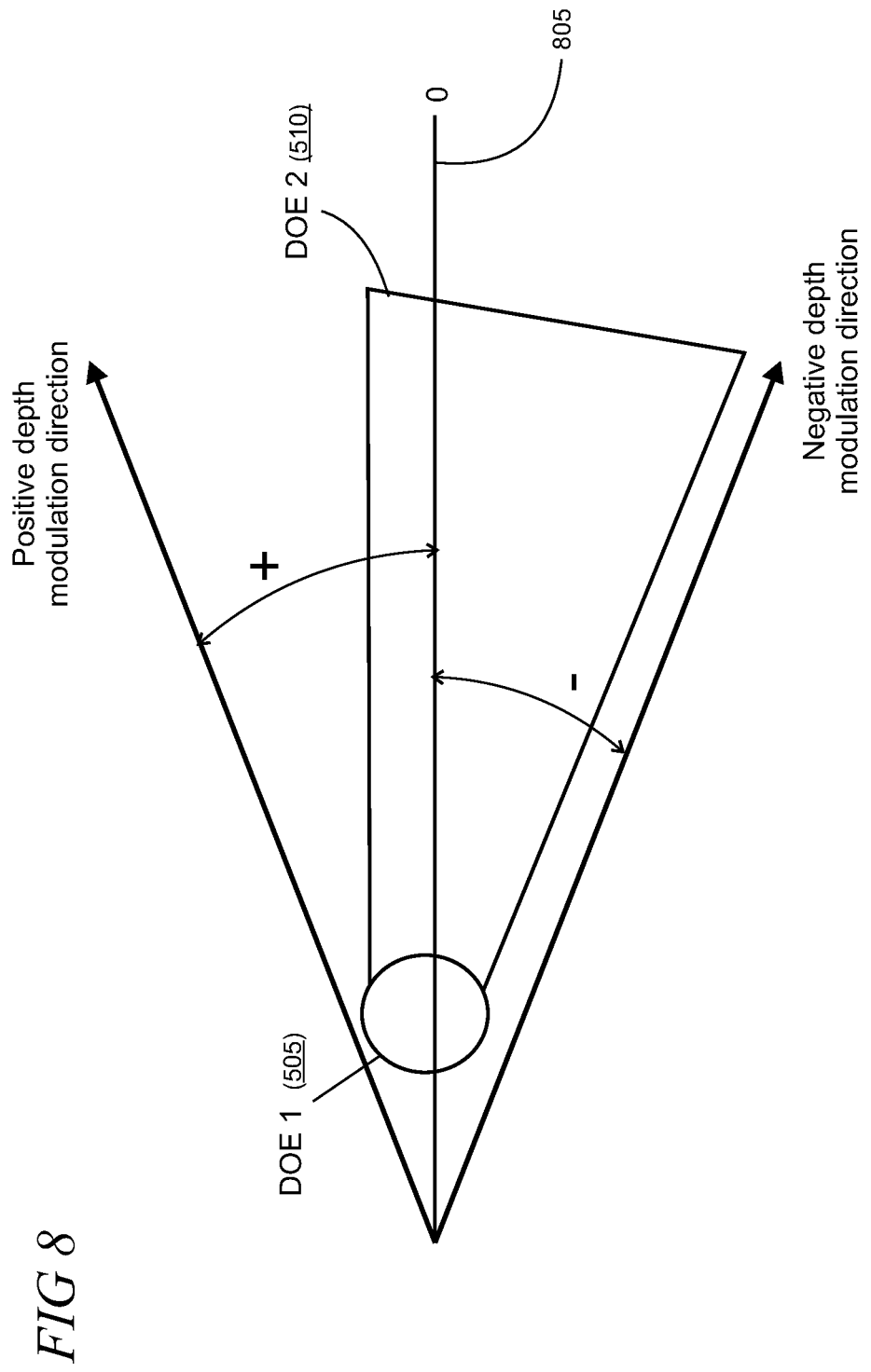
FIG. 8 shows sign notation that is applied to an illustrative DOE.

FIG. 8 shows positive and negative sign notation for modulation direction as illustratively applied to DOE 2. However, varying depth modulation direction can be applied to various ones of the DOEs 1, 2, and 3, combinations of the DOEs, or all of the DOEs depending on the needs of a particular implementation. Depth modulation direction, as the term is used in this disclosure, is defined by a direction by which grating depth changes at the steepest rate. As shown, a zero axis 805 runs parallel to a long edge of DOE 2. The depth modulation direction may be described by an angle within the plane of the waveguide with respect to the zero axis. Thus, as shown, a positive direction for depth modulation has a counterclockwise rotation with respect to the zero axis, while a negative direction for depth modulation has a clockwise rotation with respect to the zero axis.

FIGS. 9-12 show various examples of DOE 2 510 with different illustrative depth modulation directions. A gradient depicted in the figures indicates grating depth, with lighter portions of the gradient representing shallower grooves and the darker portions representing deeper grooves. The grating heights are depicted in the enlarged sectional views in order to illustrate the present principles and are not drawn to scale.

Figure 9:
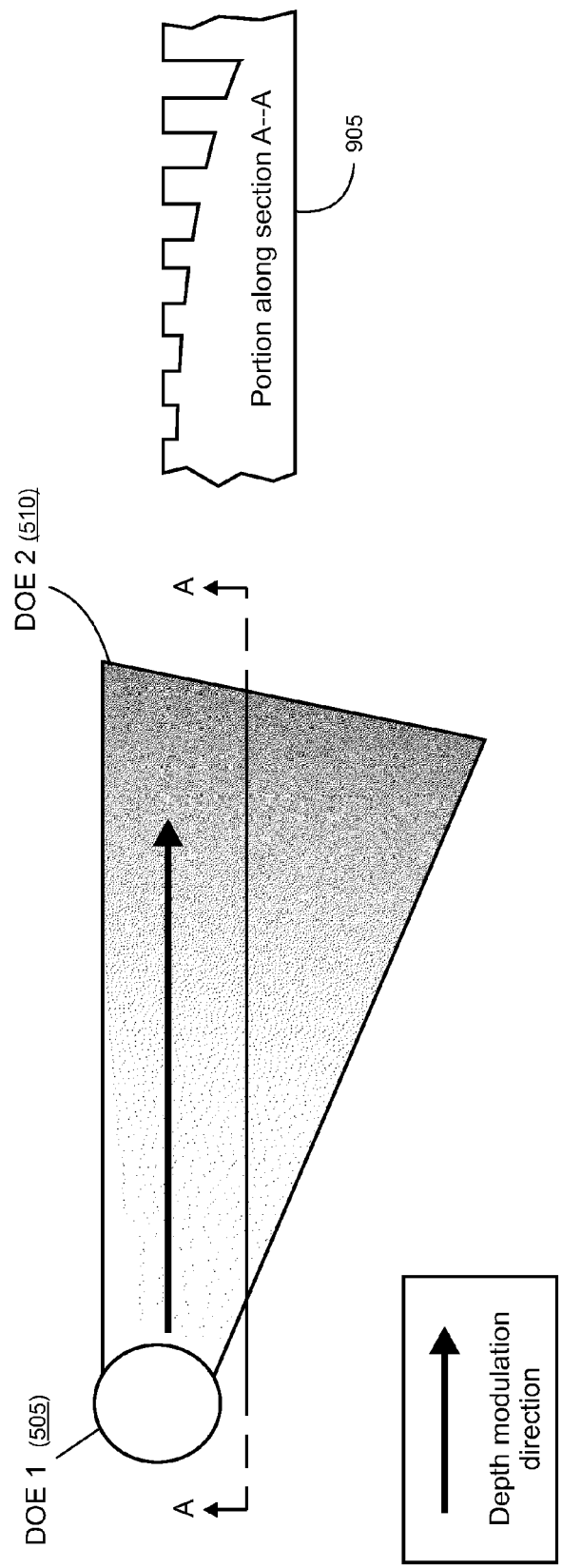
FIGS. 9-12 show various examples of a DOE with different illustrative depth modulation directions.

In FIG. 9, the depth modulation direction is zero degrees as it is parallel to the zero axis and the direction of the steepest change in grating depth is parallel to a long edge of DOE 2. The enlarged sectional view 905 of a representative portion of the gratings taken along section A-A shows grating depth increasing from left to right. Section 905 may therefore be viewed as having a grating depth with a positive slope (i.e., grating depth increases along the direction of depth modulation in DOE 2 in this particular illustrative example).

Figure 10:
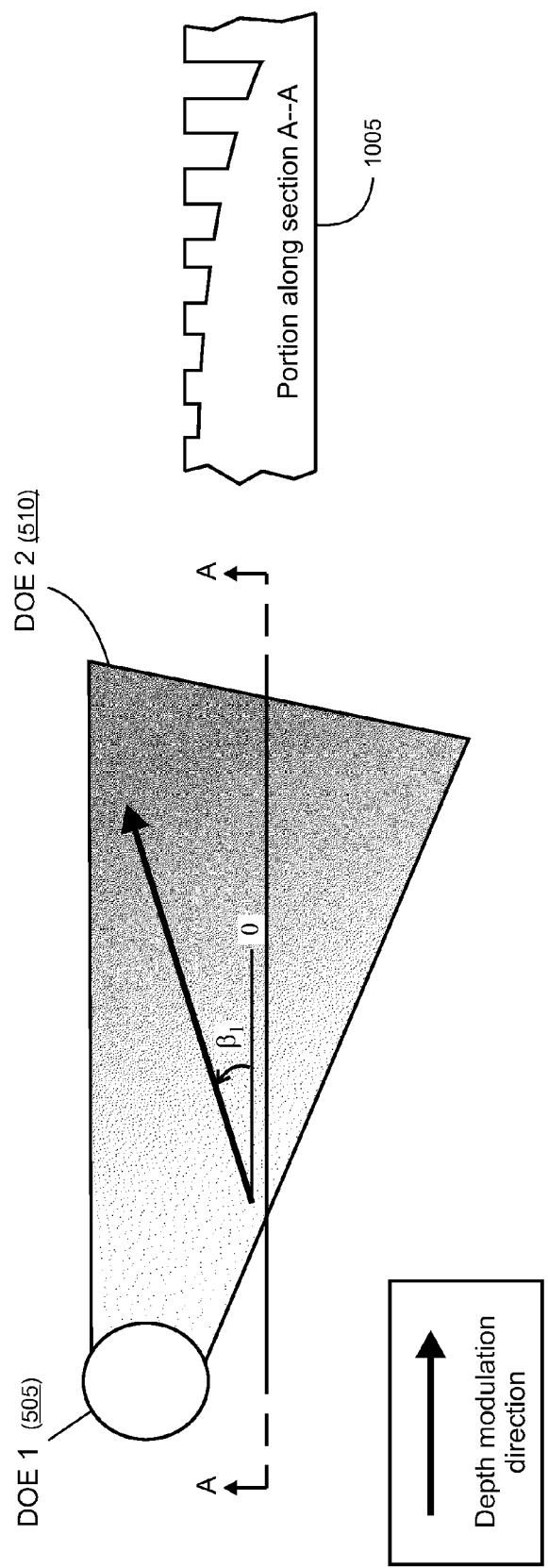

FIG. 10 shows an illustrative example in which the steepest slope for the grating depth is at an angle $\beta_1$ with respect to the zero axis. According to the coordinate system shown in FIG. 8, the depth modulation direction is positive. The enlarged sectional view 1005 shows a representative portion of the gratings taken along section A-A. The grating depth slope is positive.

Figure 11:
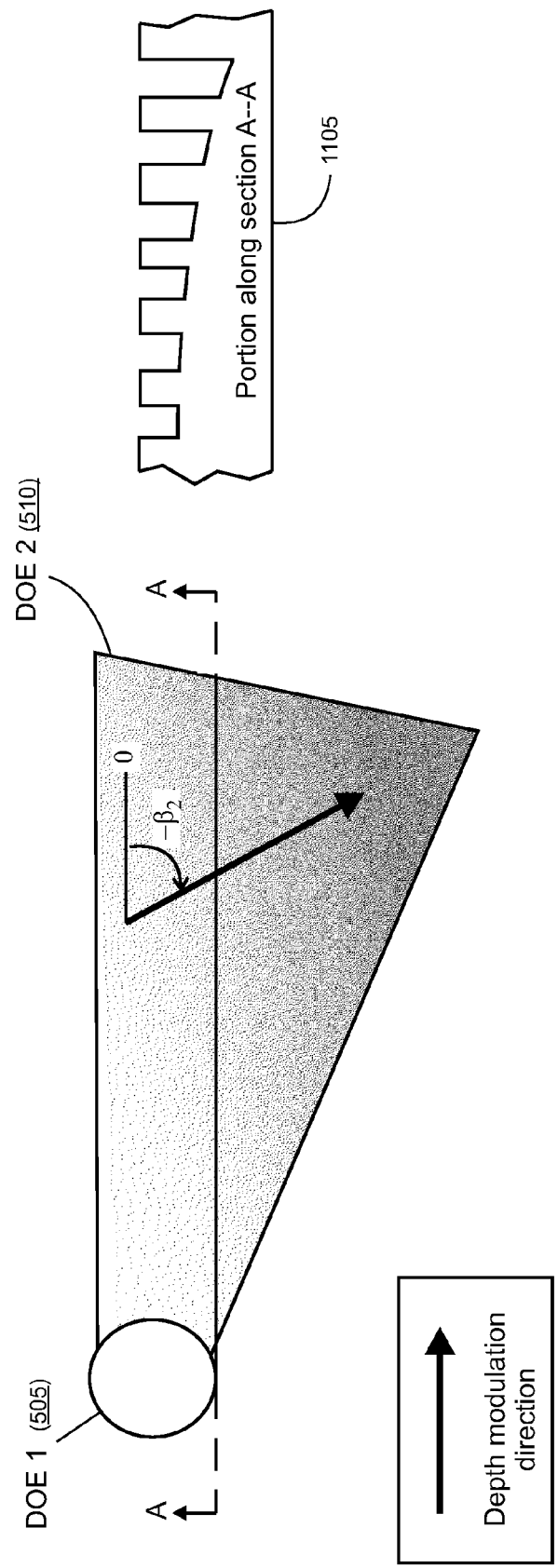

FIG. 11 shows an illustrative example in which the steepest slope for the grating depth is at an angle $-\beta_2$ with respect to the zero axis. The negative sign indicates a clockwise rotation angle, as discussed above, and the depth modulation direction is negative. The enlarged sectional view 1105 shows a representative portion of the gratings taken along section A-A. The grating depth slope is also positive in this illustrative example.

Figure 12:
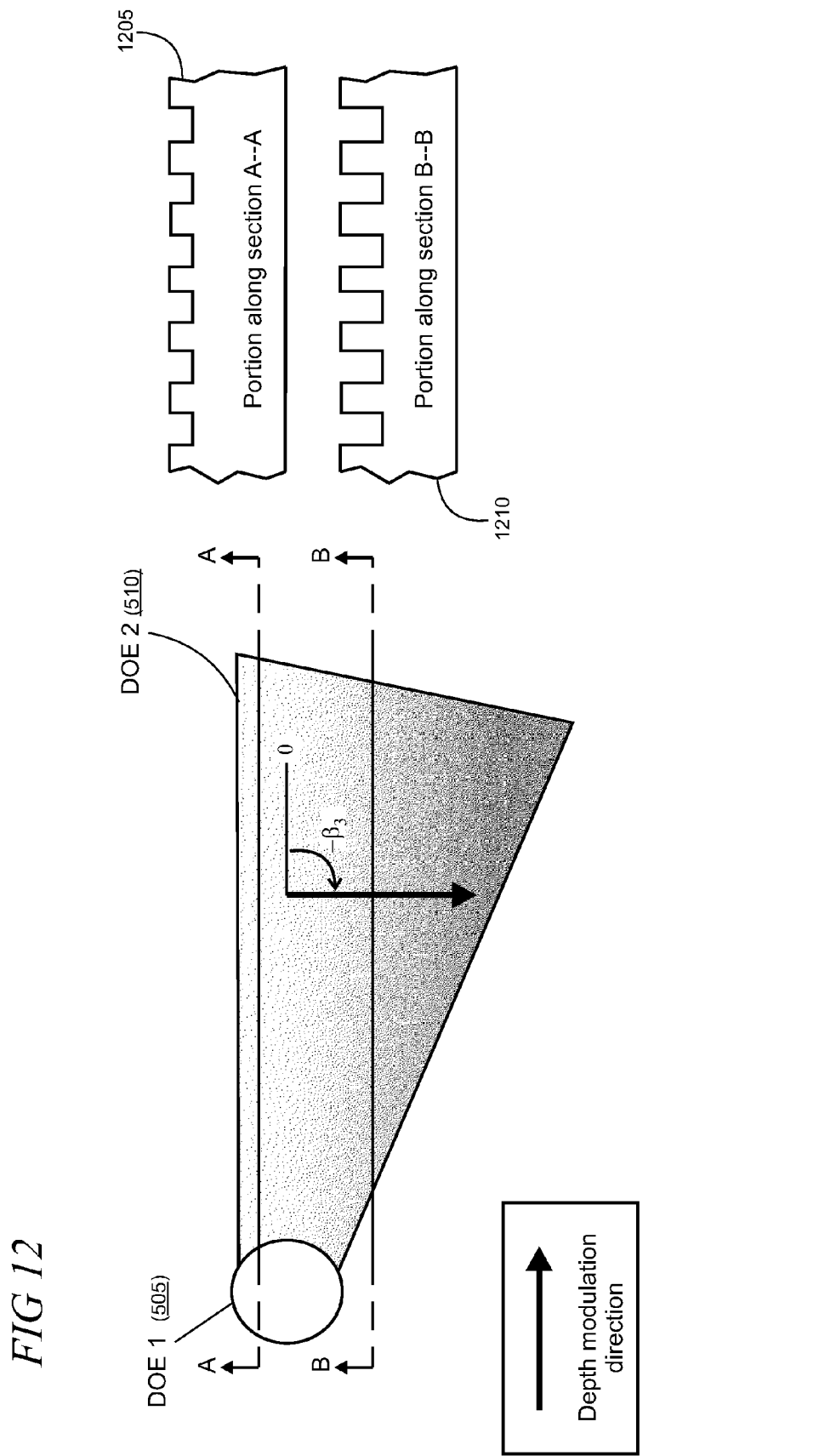

FIG. 12 shows an illustrative example in which the steepest slope for the grating depth is at an angle $-\beta_3$ with respect to the zero axis and the depth modulation direction is negative. The enlarged sectional view 1205 of a representative portion of the gratings taken along section A-A shows that the grating depth does not increase from left to right. Rather, the groove depth increases in the depth modulation direction as shown in the sectional view 1210 which depicts a representative portion of the gratings taken along section B-B.

Figure 13:
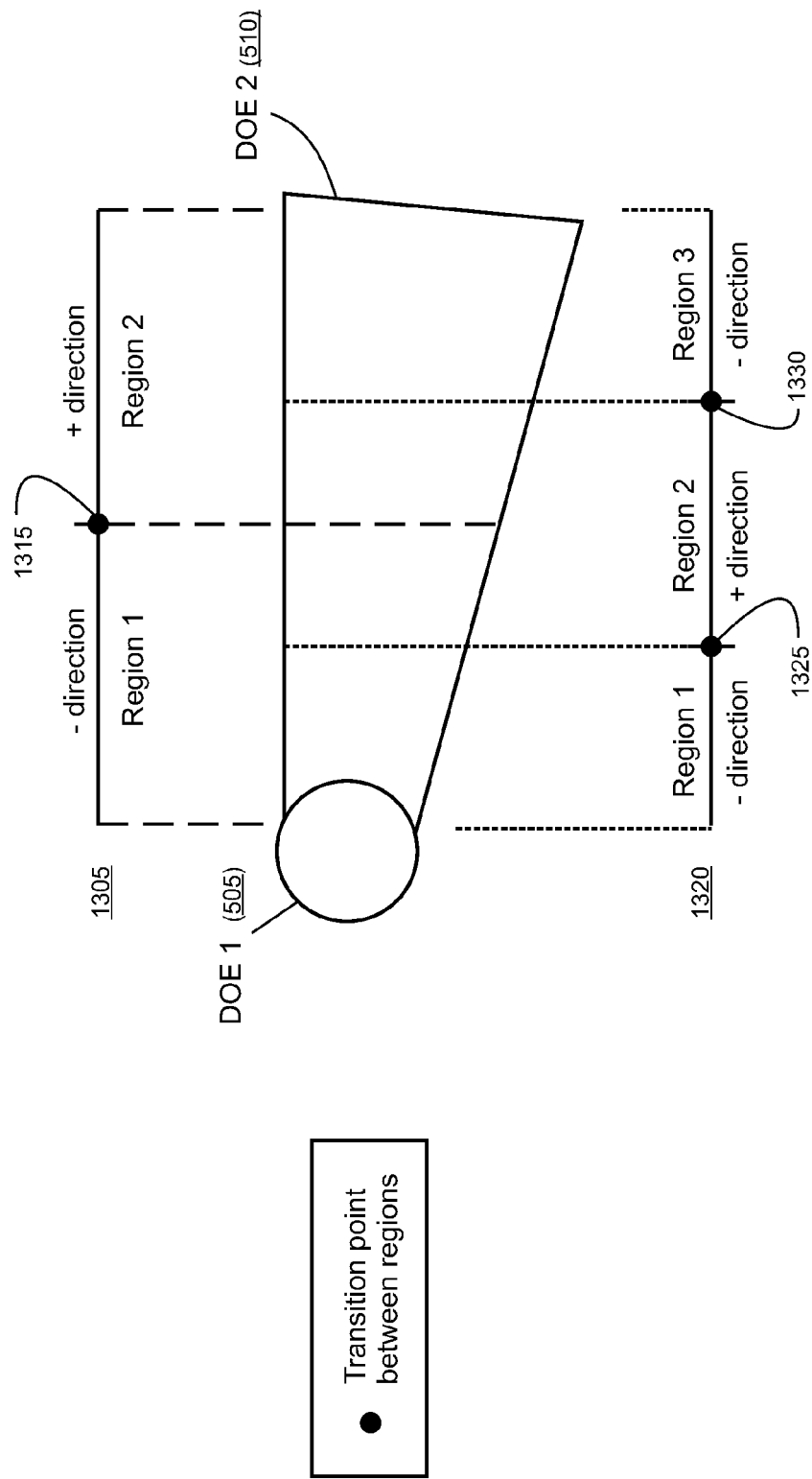
FIG. 13 shows an illustrative DOE that is configured with regions that have different depth modulation directions.

FIG. 13 shows illustrative examples in which DOE 2 510 is configured with multiple regions. In a first illustrative example, as indicated by reference numeral 1305, DOE 2 is configured with two regions, Region 1 and Region 2, in which the depth modulation direction is negative in Region 1 and the depth modulation direction is positive in Region 2. At a transition point 1315 between Region 1 and Region 2, the depth modulation changes direction. The location of the transition point can vary, and in this particular example the transition point is located approximately halfway along DOE 2. In some cases, the depth modulation direction may be changed at the transition point as a step function with no intermediate directions between negative and positive directions. In other cases, the depth modulation direction may be more smoothly varied over a distance on DOE 2 between negative and positive directions.

In a second illustrative example, as indicated by reference numeral 1320, DOE 2 is configured with three regions: Region 1, Region 2, and Region 3. The depth modulation direction is negative in Region 1, positive in Region 2, and negative in Region 3. As with the first illustrative example, the change of direction may be implemented at each of the transition points 1325 and 1330 either as a step function or using a smooth variation over some distance of DOE 2. The number of regions utilized for a given implementation can vary according to design targets, DOE size, and manufacturing capabilities, among other factors.

In an illustrative non-limiting example, DOE 2 includes two regions, Region 1 and Region 2 as shown in FIG. 11. The depth modulation direction is negative at an approximate angle of −13 degrees with respect to the zero axis in Region 1. The depth modulation direction changes at the transition point 1115 to a positive direction having an approximate angle of +13 degrees with respect to the zero axis in Region 2.

By varying the direction of modulation at one or more transition points between two or more regions in a DOE, optical resolution and uniformity may be increased and banding can be reduced. In addition, manufacturing tolerances for parameters such as thickness, surface roughness, and grating geometry can be loosened compared with DOEs having constant depth modulation direction while maintaining at least comparable levels of optical resolution and uniformity.

Figure 14:
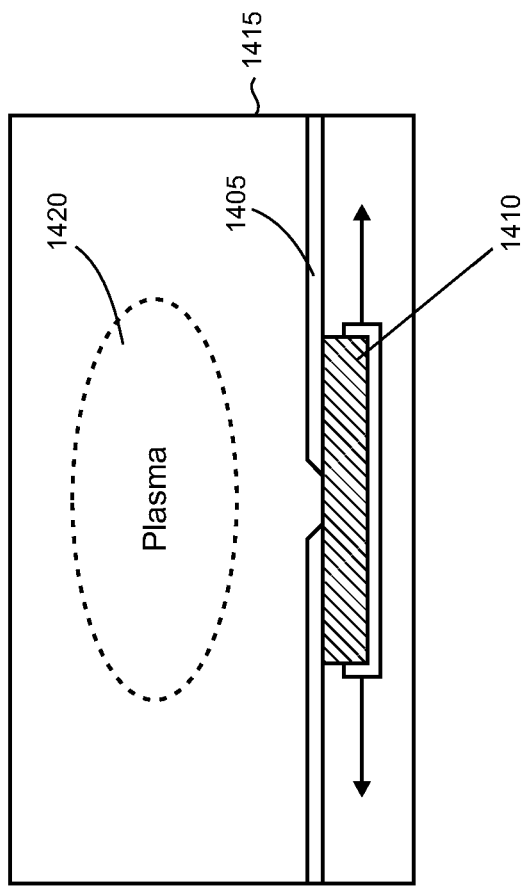
FIG. 14 shows an illustrative arrangement for DOE fabrication using a mask that moves relative to a substrate.

FIG. 14 shows an illustrative arrangement for DOE fabrication using a mask 1405 that moves relative to a photosensitive grating substrate 1410 within an enclosure 1415. A reactive ion etching plasma 1420 is used to adjust the thickness of the etching on the grating substrate at various positions by moving the substrate relative to the mask using, for example, a computer-controller stepper functionality or other suitable control system. In an illustrative example, the etching may be performed using a reactive ion beam etching (RIBE). However, other variations of ion beam etching may be utilized in various implementations including, for example, magnetron reactive ion etching (MRIE), high density plasma etching (HDP), transformer coupled plasma etching (TCP), inductively coupled plasma etching (ICP), and electron cyclotron resonance plasma etching (ECR).

By controlling the exposure of the substrate to the plasma through the mask aperture, grating depth can be varied as a function of position over the extent of the substrate. The resulting microstructure on the substrate may be replicated for mass production in a lightweight polymer material using one of cast-and-cure, embossing, compression molding, or compression injection molding, for example.

Figure 15:
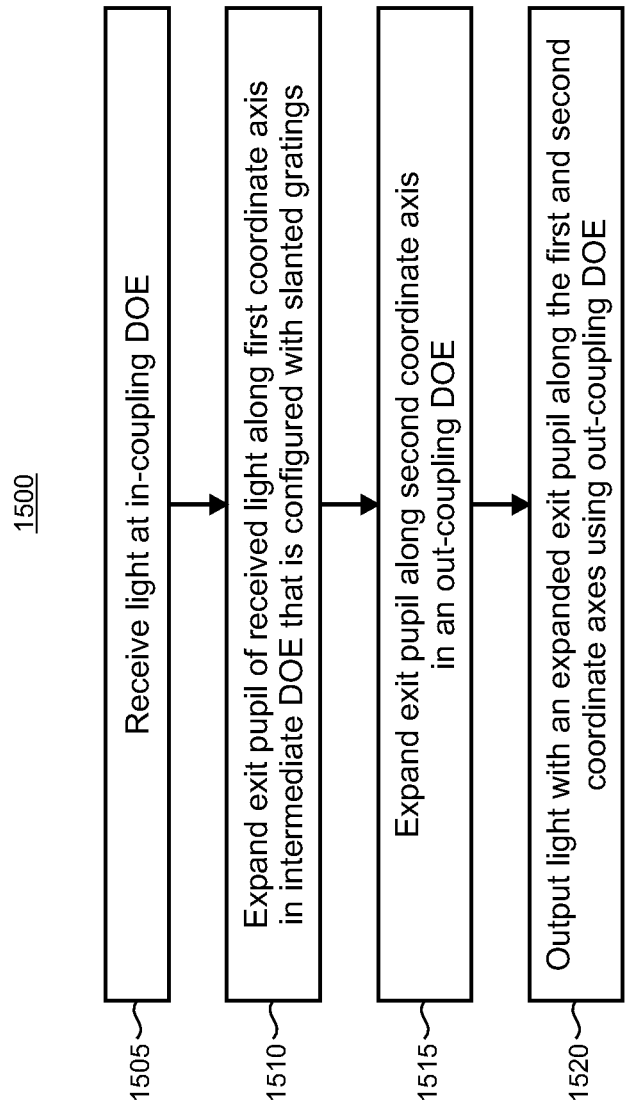
FIG. 15 shows an illustrative method.

FIG. 15 is a flowchart of an illustrative method 1500. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1505, light is received at an in-coupling DOE. The in-coupling grating is disposed in an EPE and interfaces with the downstream intermediate DOE that is disposed in the EPE. In step 1510, the exit pupil of the received light is expanded along a first coordinate axis in the intermediate DOE. The intermediate DOE is configured with at least two regions in which depth modulation direction is changed at each of the transitions between regions. The gratings can be straight or slanted in the intermediate DOE. In step 1515, the exit pupil is expanded in an out-coupling DOE which outputs light with an expanded exit pupil relative to the received light at the in-coupling DOE along the first and second coordinate axes in step 1520. The intermediate DOE is configured to the interface with a downstream out-coupling DOE. In some implementations, the out-coupling DOE may be apodized with shallow gratings that are configured to be either straight or slanted.

DOEs with varying depth modulation direction may be incorporated into a display system that is utilized in a virtual or mixed reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 16:
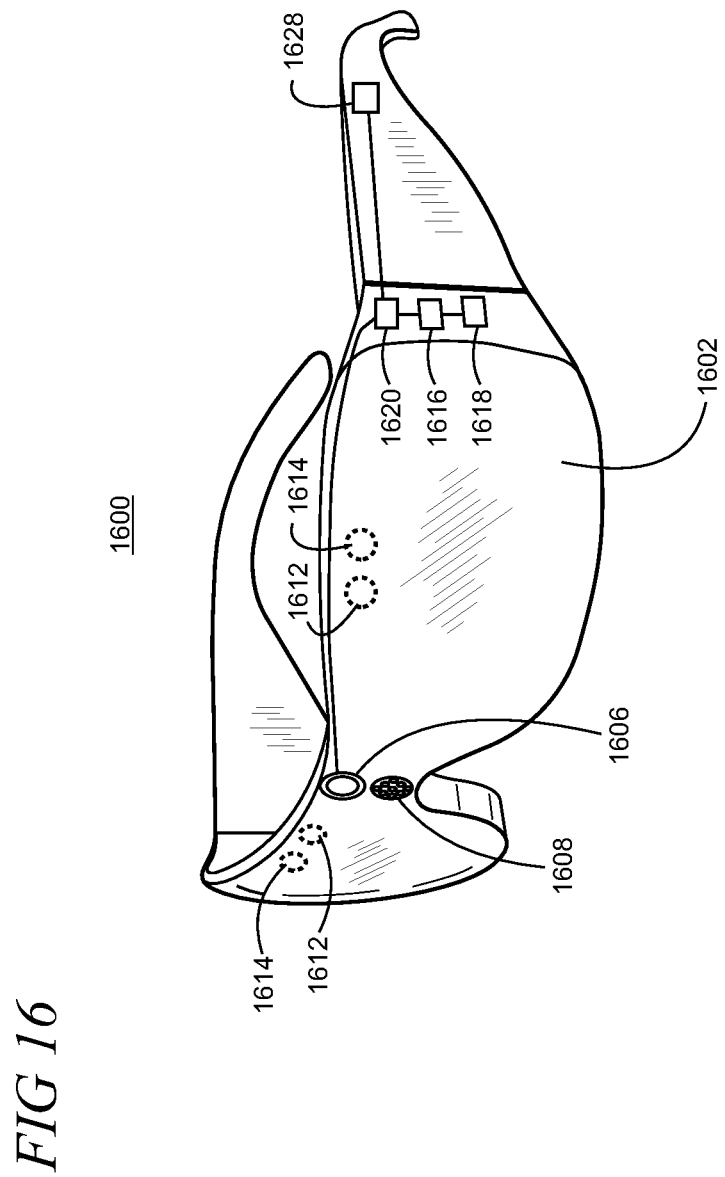
FIG. 16 is a pictorial view of an illustrative example of a virtual reality or mixed reality head mounted display (HMD) device.
Figure 17:
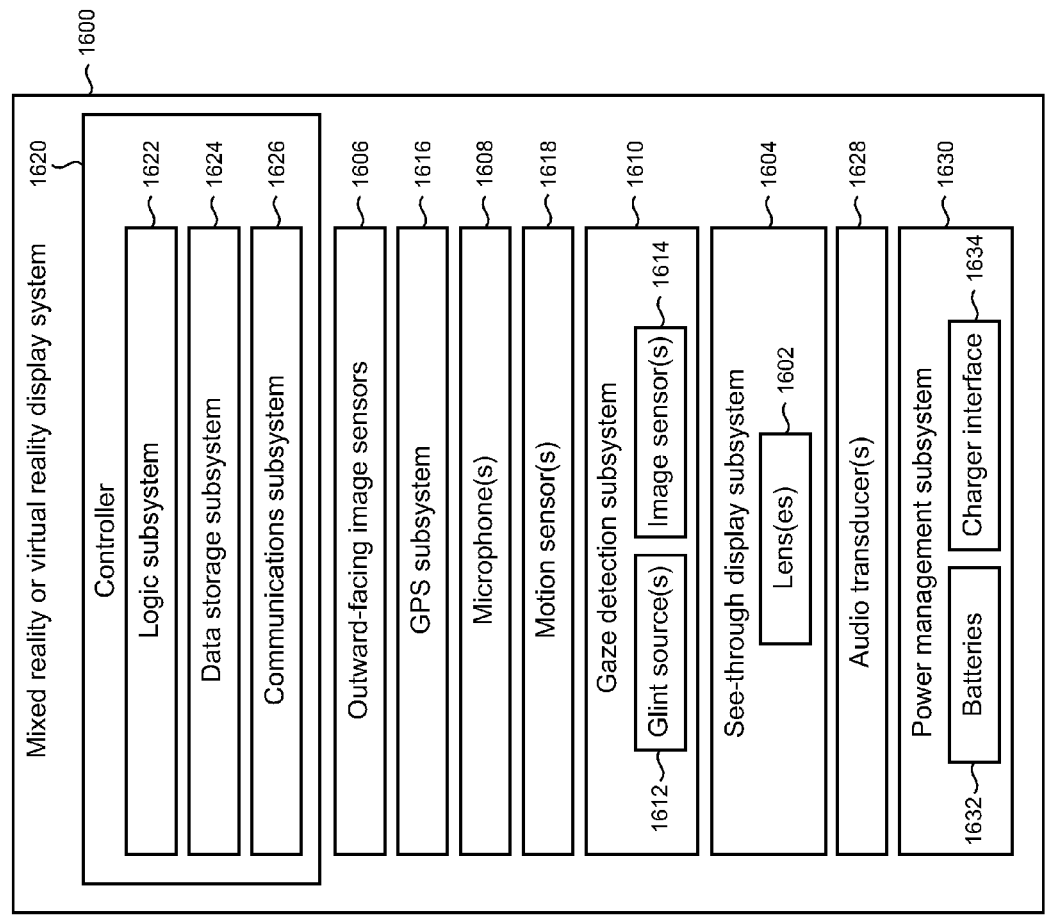
FIG. 17 shows a block diagram of an illustrative example of a virtual reality or mixed reality HMD device.
Figure 18:
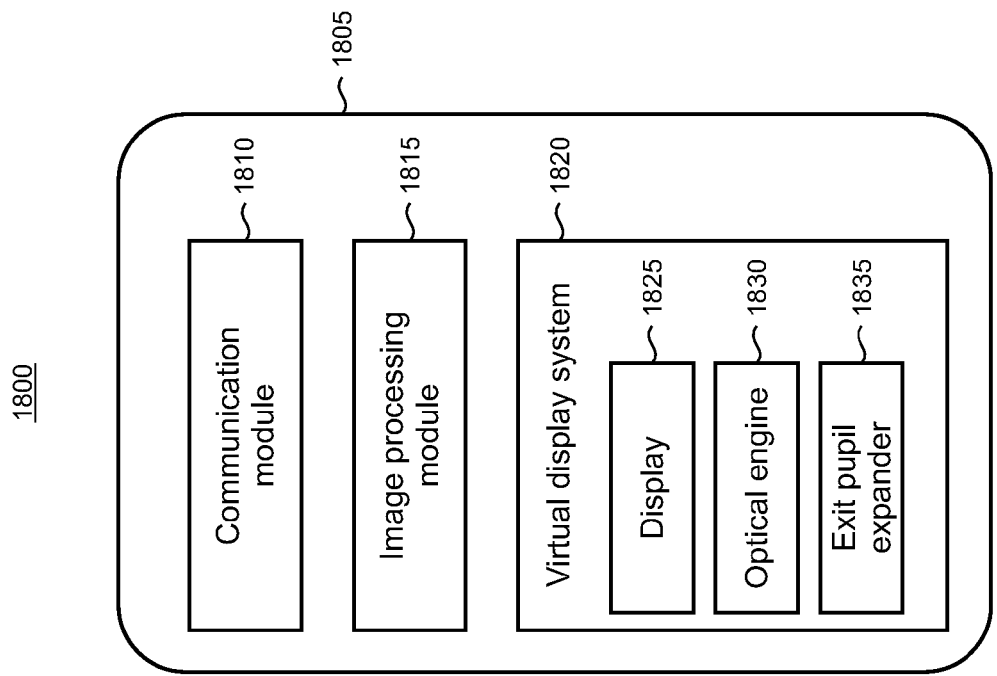
FIG. 18 shows a block diagram of an illustrative electronic device that incorporates an exit pupil expander.

FIG. 16 shows one particular illustrative example of a see-through, mixed reality or virtual reality display system 1600, and FIG. 17 shows a functional block diagram of the system 1600. Display system 1600 comprises one or more lenses 1602 that form a part of a see-through display subsystem 1604, such that images may be displayed using lenses 1602 (e.g. using projection onto lenses 1602, one or more waveguide systems incorporated into the lenses 1602, and/or in any other suitable manner). Display system 1600 further comprises one or more outward-facing image sensors 1606 configured to acquire images of a background scene and/or physical environment being viewed by a user, and may include one or more microphones 1608 configured to detect sounds, such as voice commands from a user. Outward-facing image sensors 1606 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 1600 may further include a gaze detection subsystem 1610 configured for detecting a direction of gaze of each eye of a user or a direction or location of focus, as described above. Gaze detection subsystem 1610 may be configured to determine gaze directions of each of a user's eyes in any suitable manner. For example, in the illustrative example shown, a gaze detection subsystem 1610 includes one or more glint sources 1612, such as infrared light sources, that are configured to cause a glint of light to reflect from each eyeball of a user, and one or more image sensors 1614, such as inward-facing sensors, that are configured to capture an image of each eyeball of the user. Changes in the glints from the user's eyeballs and/or a location of a user's pupil, as determined from image data gathered using the image sensor(s) 1614, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1610 may have any suitable number and arrangement of light sources and image sensors. In some implementations, the gaze detection subsystem 1610 may be omitted.

The display system 1600 may also include additional sensors. For example, display system 1600 may comprise a global positioning system (GPS) subsystem 1616 to allow a location of the display system 1600 to be determined. This may help to identify real world objects, such as buildings, etc. that may be located in the user's adjoining physical environment.

The display system 1600 may further include one or more motion sensors 1618 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1606. The use of motion data may allow changes in gaze location to be tracked even if image data from outward-facing image sensor(s) 1606 cannot be resolved.

In addition, motion sensors 1618, as well as microphone(s) 1608 and gaze detection subsystem 1610, also may be employed as user input devices, such that a user may interact with the display system 1600 via gestures of the eye, neck and/or head, as well as via verbal commands in some cases. It may be understood that sensors illustrated in FIGS. 16 and 17 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1600 can further include a controller 1620 having a logic subsystem 1622 and a data storage subsystem 1624 in communication with the sensors, gaze detection subsystem 1610, display subsystem 1604, and/or other components through a communications subsystem 1626. The communications subsystem 1626 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1624 may include instructions stored thereon that are executable by logic subsystem 1622, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1600 is configured with one or more audio transducers 1628 (e.g., speakers, earphones, etc.) so that audio can be utilized as part of a mixed reality or virtual reality experience. A power management subsystem 1630 may include one or more batteries 1632 and/or protection circuit modules (PCMs) and an associated charger interface 1634 and/or remote power interface for supplying power to components in the display system 1600.

It may be appreciated that the display system 1600 is described for the purpose of example, and thus is not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

As shown in FIG. 17, an EPE incorporating DOEs with varying depth modulation direction can be used in a mobile or portable electronic device 1700, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1700 includes a housing 1705 to house a communication module 1710 for receiving and transmitting information from and to an external device, or a remote system or service (not shown).

The portable device 1700 may also include an image processing module 1715 for handling the received and transmitted information, and a virtual display system 1720 to support viewing of images. The virtual display system 1720 can include a micro-display or an imager 1725 and an optical engine 1730. The image processing module 1715 may be operatively connected to the optical engine 1730 to provide image data, such as video data, to the imager 1725 to display an image thereon. An EPE 1735 using one or more DOEs with varying depth modulation direction can be optically linked to an optical engine 1730.

An EPE using one or more DOEs with varying depth modulation direction may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present diffractive optical elements with varying direction for depth modulation are now presented by way of illustration and not as an exhaustive list of all embodiments. An example includes an optical system, comprising: a substrate of optical material; a first diffractive optical element (DOE) disposed on the substrate, the first DOE having an input surface and configured as an in-coupling grating to receive one or more optical beams as an input; and a second DOE disposed on the substrate and configured for pupil expansion of the one or more optical beams along a first direction, wherein at least a portion of the second DOE includes two or more regions in which a depth modulation direction is constant within a region and changes at each transition between regions, the depth modulation direction described by a steepest change of grating depth in the second DOE.

In another example, the optical system further includes a third DOE disposed on the substrate, the third DOE having an output surface and configured for pupil expansion of the one or more optical beams along a second direction, and further configured as an out-coupling grating to couple, as an output from the output surface, one or more optical beams with expanded pupil relative to the input. In another example, at least a portion of the first DOE or at least a portion the third DOE is configured with two or more regions in which a depth modulation direction changes at each transition between the regions. In another example, at least a portion of the first DOE, second DOE, or third DOE includes gratings that are slanted. In another example, the one or more optical beams received at the first DOE emanate as a virtual image produced by a micro-display or imager.

A further example includes an electronic device, comprising: a data processing unit; an optical engine operatively connected to the data processing unit for receiving image data from the data processing unit; an imager operatively connected to the optical engine to form images based on the image data and to generate one or more input optical beams incorporating the images; and an exit pupil expander, responsive to the one or more input optical beams, comprising a structure on which multiple diffractive optical elements (DOEs) are disposed, one or more of the DOEs being configured with gratings of varying depth, in which the exit pupil expander is configured to provide one or more output optical beams, using one or more of the DOEs, as a near eye virtual display with an expanded exit pupil, and wherein one or more of the DOEs is configured to include two or more regions in which depth modulation direction is different in each of the two or more regions, the depth modulation direction in a region being a direction for which a rate of change of grating depth is greatest.

In another example, the exit pupil expander provides pupil expansion in two directions. In another example, grating depth in a region increases along the depth modulation direction. In another example, grating depth in a region decreases along the depth modulation direction. In another example, gratings are asymmetric. In another example, the electronic device is implemented in a head mounted display device or portable electronic device. In another example, each of the one or more input optical beams is produced by a corresponding one or more sources. In another example, the structure is curved or partially spherical. In another example, two or more of the DOEs are non-co-planar.

A further example includes a method, comprising: receiving light at an in-coupling diffractive optical element (DOE) disposed in an exit pupil expander; expanding an exit pupil of the received light along a first coordinate axis in an intermediate DOE disposed in the exit pupil expander; expanding the exit pupil along a second coordinate axis in an out-coupling DOE disposed in the exit pupil expander; and outputting light with an expanded exit pupil relative to the received light at the in-coupling DOE along the first and second coordinate axes using the out-coupling DOE, in which the intermediate DOE is configured with at least two regions wherein a depth modulation direction in a first region of the at least two regions has a negative angle in a plane of the intermediate DOE with respect to a zero axis and a depth modulation direction in a second region of the at least two regions has a positive angle in the plane with respect to the zero axis, wherein depth modulation direction is described by a steepest change of grating depth in each respective region.

In another example, the zero axis is parallel to a long edge of the intermediate DOE. In another example, the in-coupling DOE, the intermediate DOE, or the out-coupling DOE is formed with a polymer that is molded from a substrate that is etched using ion beam etching with a moving mask. In another example, at least a portion of the out-coupling DOE is an apodized diffraction grating having shallow grooves relative to the in-coupling DOE or the intermediate DOE. In another example, the method is performed in a near eye display system. In another example, the output light provides a virtual display to a user of the near eye display system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An optical system, comprising:
   a substrate of optical material;
   a first diffractive optical element (DOE) disposed on the substrate, the first DOE having an input surface and configured as an in-coupling grating to receive one or more optical beams as an input; and
   a second DOE disposed on the substrate and configured for pupil expansion of the one or more optical beams along a first direction,
      wherein at least a portion of the second DOE includes two or more regions in which a depth modulation direction is constant within a region and changes at each transition between regions, the depth modulation direction described by a steepest change of grating depth in the second DOE, and
      wherein the two or more regions in the second DOE do not include multi-level grating features.

2. The optical system of claim 1, further comprising a third DOE disposed on the substrate, the third DOE having an output surface and configured for pupil expansion of the one or more optical beams along a second direction, and further configured as an out-coupling grating to couple, as an output from the output surface, the one or more optical beams with expanded pupil relative to the input.

3. The optical system of claim 2, in which at least a portion of the first DOE or at least a portion the third DOE is configured with two or more regions in which a depth modulation direction changes at each transition between the regions.

4. The optical system of claim 3, in which at least the portion of the first DOE, second DOE, or third DOE includes gratings that are slanted.

5. The optical system of claim 1, in which the one or more optical beams received at the first DOE emanate as a virtual image produced by a micro-display or imager.

6. An electronic device, comprising:
   a data processing unit;
   an optical engine operatively connected to the data processing unit for receiving image data from the data processing unit;
   an imager operatively connected to the optical engine to form images based on the image data and to generate one or more input optical beams incorporating the images; and
   an exit pupil expander, responsive to the one or more input optical beams, comprising a structure on which multiple diffractive optical elements (DOEs) are disposed, one or more of the DOEs being configured with gratings of varying depth,
      in which the exit pupil expander is configured to provide one or more output optical beams, using one or more of the DOEs, as a near eye virtual display with an expanded exit pupil,
      wherein one or more of the DOEs is configured to include two or more regions in which depth modulation direction is different in each of the two or more regions, the depth modulation direction in a region being a direction for which a rate of change of grating depth is greatest, and
      and wherein the two or more regions in the one or more DOEs do not include multi-level grating features.

7. The electronic device of claim 6, in which the exit pupil expander provides pupil expansion in two directions.

8. The electronic device of claim 6, in which grating depth in a region increases along the depth modulation direction.

9. The electronic device of claim 6, in which grating depth in a region decreases along the depth modulation direction.

10. The electronic device of claim 6, in which gratings are asymmetric.

11. The electronic device of claim 6, as implemented in a head mounted display device or portable electronic device.

12. The electronic device of claim 6, in which each of the one or more input optical beams is produced by a corresponding one or more sources.

13. The electronic device of claim 6, in which the structure is curved or partially spherical.

14. The electronic device of claim 6, in which two or more of the DOEs are non-co-planar.

15. A method, comprising:
   receiving light at an in-coupling diffractive optical element (DOE) disposed in an exit pupil expander;
   expanding an exit pupil of the received light along a first coordinate axis in an intermediate DOE disposed in the exit pupil expander;
   expanding the exit pupil along a second coordinate axis in an out-coupling DOE disposed in the exit pupil expander; and
   outputting light with an expanded exit pupil relative to the received light at the in-coupling DOE along the first and second coordinate axes using the out-coupling DOE,
      in which the intermediate DOE is configured with at least two regions wherein a depth modulation direction in a first region of the at least two regions has a negative angle in a plane of the intermediate DOE with respect to a zero axis and a depth modulation direction in a second region of the at least two regions has a positive angle in the plane with respect to the zero axis, wherein depth modulation direction is described by a steepest change of grating depth in each respective region, and
      and wherein the at least two regions in the intermediate DOE do not include multi-level grating features.

16. The method of claim 15, in which the zero axis is parallel to a long edge of the intermediate DOE.

17. The method of claim 15, in which the in-coupling DOE, the intermediate DOE, or the out-coupling DOE is formed with a polymer that is molded from a substrate that is etched using ion beam etching with a moving mask.

18. The method of claim 15, further in which at least a portion of the out-coupling DOE is an apodized diffraction grating having shallow grooves relative to the in-coupling DOE or the intermediate DOE.

19. The method of claim 15, as performed in a near eye display system.

20. The method of claim 19, in which the output light provides a virtual display to a user of the near eye display system.

* * * * *